US012761829B2

(12) United States Patent
Teo et al.

(10) Patent No.: US 12,761,829 B2
(45) Date of Patent: Oct. 13, 2026

(54) ADJUSTING READ THRESHOLD VOLTAGE USING COV OFFSET

(71) Applicant: Micron Technology, Inc., Boise, ID (US)

(72) Inventors: Yew Shen Teo, Singapore (SG); Wai Leong Chin, Singapore (SG); Jiejuan Liu, Singapore (SG)

(73) Assignee: Micron Technology, Inc., Boise, ID (US)

( * ) Notice: Subject to any disclaimer, the term of this patent is extended or adjusted under 35 U.S.C. 154(b) by 73 days.

(21) Appl. No.: 18/887,718

(22) Filed: Sep. 17, 2024

(65) Prior Publication Data

US 2026/0079637 A1 Mar. 19, 2026

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

2018/0047444 A1 * 2/2018 Pignatelli .............. G06F 3/0614
2022/0076765 A1 * 3/2022 Muchherla ............. G11C 16/26

* cited by examiner

*Primary Examiner* — Guerrier Merant
(74) *Attorney, Agent, or Firm* — Schwegman Lundberg & Woessner, P.A.

(57) ABSTRACT

This disclosure is directed to a memory device that intelligently applies an additional read offset when reading memory blocks. The memory device receives a request to read a portion from a memory device and computes a read threshold voltage for reading data from the portion of the memory device. The memory device determines whether the portion is associated with a pseudo-folding event and, in response to determining whether the portion is associated with the pseudo folding event, selectively applies an additional read offset to the read threshold voltage to read the data from the portion of the memory device.

20 Claims, 6 Drawing Sheets

ADJUSTING READ THRESHOLD VOLTAGE USING COV OFFSET

TECHNICAL FIELD

Examples of the disclosure relate generally to memory sub-systems and, more specifically, to reading data from a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

DETAILED DESCRIPTION

Figure 1:
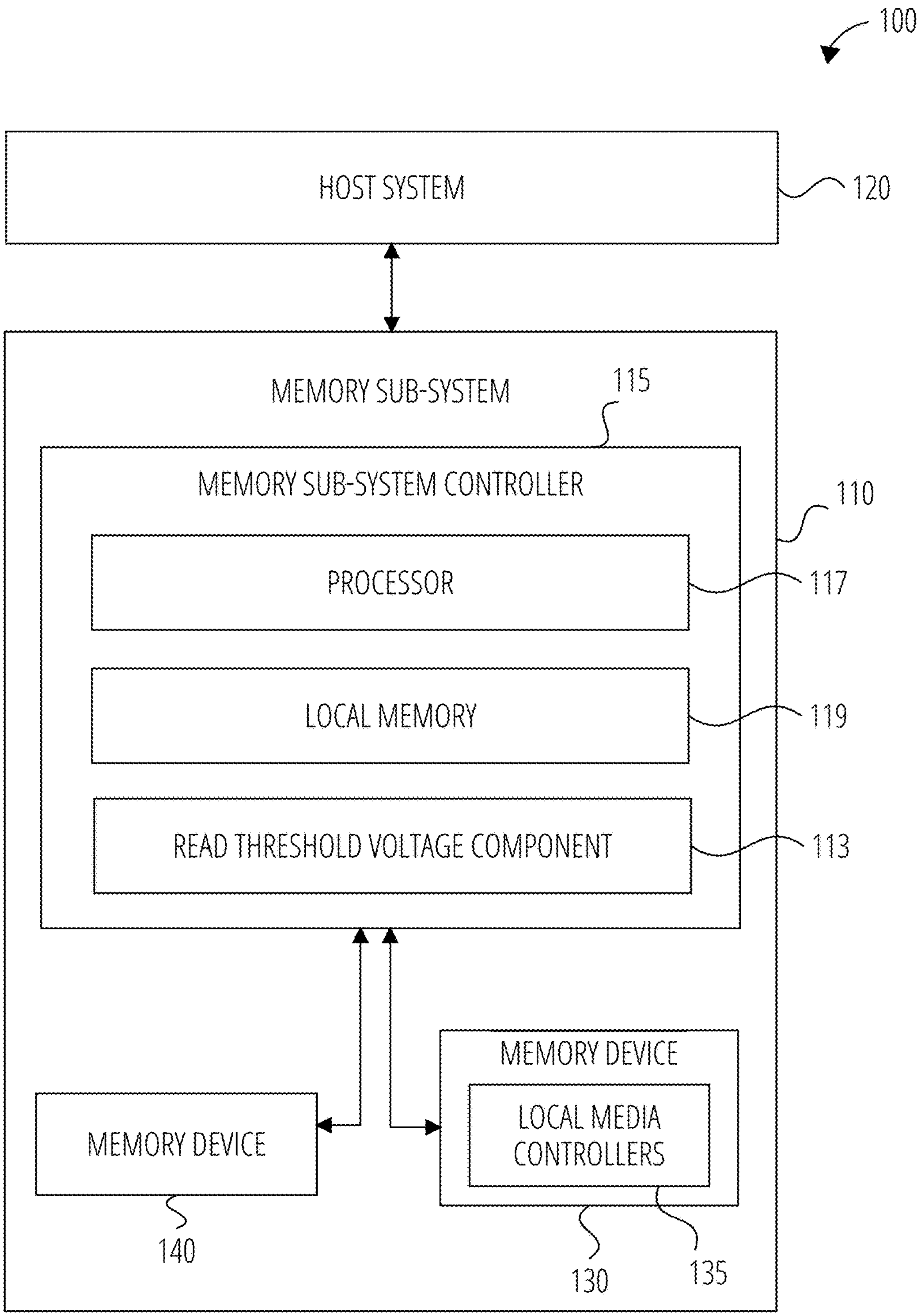
FIG. 1 is a block diagram illustrating an example computing system that includes a memory sub-system, in accordance with some examples.

The present disclosure is directed to a memory sub-system that intelligently and selectively adjusts a read threshold voltage using a center of valley (CoV) that was previously determined. Specifically, when a portion, such as memory block is being read, the memory sub-system determines whether the portion is associated with a pseudo-folding event. For example, the memory sub-system determines whether the portion is on a list of portions that are associated with pseudo-folding events. A "pseudo-folding event" represents a memory block or memory block portion that was identified in a media scan operation as having a corresponding read bit error rate (RBER) that exceeds a threshold value and has a corresponding valley width that is greater than a threshold valley width. The valley width can be measured by a valley health check (VHC) performed during the media scan operation using a CoV that has been computed using a CoV algorithm, such as ARC. In such cases, the memory sub-system retrieves a CoV read offset that was computed in response to the previously performed media scan. The memory sub-system then uses the CoV read offset to adjust and/or correct the read threshold voltage that is used to read data from the portion. This can reduce the read bit error rate (RBER) associated with reading data from the portion which can improve the overall performance of the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command, erase command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection (GC) management operations. The data that is re-written, for example as initiated by the firmware, is hereinafter referred to as "GC data."

"User data" hereinafter generally refers to host data and GC data. "System data" hereinafter refers to data that is created and/or maintained by the memory sub-system for performing operations in response to host requests and for media management. Examples of system data include, and are not limited to, system tables (e.g., logical-to-physical memory address mapping table, also referred to herein as a L2P table, data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred to as word lines (WLs)), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

Media scan and valley health check (VHC) are two useful processes employed in NAND flash memory management to ensure data integrity and optimize performance. Media scan is a proactive maintenance procedure that systematically examines the entire NAND flash memory to detect and address potential issues before they result in data loss. During a media scan, the controller reads each block of data without transferring it to the host, checking for read errors and evaluating the overall health of each block. If errors are detected, the controller may attempt to correct them using sophisticated error correction codes (ECC). Blocks exhibiting high error rates may be flagged for refresh or retirement, and data from weak blocks may be strategically relocated to healthier blocks to prevent data loss. This process typically involves multiple read operations at different voltage thresholds to accurately assess the state of each cell. Specifically, the VHC involves a process that computes a CoV (e.g., using an ARC process) of a particular cell or region of a memory portion. In some cases, a CFBit count associated with different storage levels can be used to determine the CoV. Using the CoV, additional data can be read by applying two or more additional read threshold voltages relative to the CoV. For example, a first read threshold voltage can be applied that is less than the CoV, such as by 10 DAC less than the CoV and a second read threshold voltage can be applied that is more than the CoV, such as by 10 DAC more than the CoV. The number of errors in the data read by applying the first and second read threshold voltages can be determined. Based on the number of errors, the width of the valley can be determined. A smaller number of errors represents a large enough width whereas if the number of errors transgresses a threshold, the width of the valley may not be large enough. In such cases, the portion can be refreshed.

The current approaches to managing SCL and read errors in NAND flash memory, particularly in replacement gate (RG) cells, present several inefficiencies and resource waste. RG cells inherently experience SCL, which is a function of time and temperature, leading to higher threshold voltage (Vt) distributions as cells lose charge. This degradation can adversely impact performance and workload by increasing the occurrence of error handling procedures. Existing algorithms attempt to track SCL effects by applying suitable read offsets to host reads. To do so, existing techniques leverage the Block Family Error Avoidance (BFEA) algorithm for addressing SCL effects by applying additional read offsets to host reads by tracking SCL on each block stripe (BS) and calibrating accordingly. However, this approach applies the same read offset to all blocks within a block family, which is a coarse method of categorizing blocks with similar SCL effects. This generalization fails to account for potential block-to-block variations within the same block family or WL to WL variations, reducing the algorithm's effectiveness.

Media scan algorithms, while capable of detecting blocks with high RBERs and initiating early block folding, are triggered by time or workload-driven mechanisms that can degrade performance. Media scan includes a VHC process to determine if blocks need refreshing. However, it does not refresh blocks if the valley width maintains a good margin. Information obtained from the VHC is currently not being integrated into other system algorithms which represents a missed opportunity for more comprehensive error management. These approaches collectively result in inefficient use of resources and potential performance degradation. The coarse categorization of blocks in the BFEA algorithm may lead to unnecessary read operations or missed opportunities for error correction. The lack of integration between the VHC results and other system algorithms means that valuable data on cell health is not being fully utilized to optimize overall system performance and longevity. This fragmented approach to error management and SCL mitigation represents a significant area for improvement in NAND flash memory management systems.

The disclosed techniques address these challenges by providing a memory controller that intelligently and selectively adjusts a read threshold voltage using a CoV that was previously determined, such as when a media scan operation was performed including a VHC. Specifically, when a portion, such as a memory block is being read, the disclosed techniques determine whether the portion is associated with a pseudo-folding event. For example, the disclosed techniques determine whether the portion is on a list of portions that are associated with pseudo-folding events. In such cases, the disclosed techniques retrieve a CoV read offset that was computed in response to a media scan that was previously performed on the portion. The disclosed techniques then use the CoV to adjust and/or correct the read threshold voltage that is used to read data from the portion (e.g., a page, WL, word line group or other region of the memory block that is being read). In this way, different read threshold voltages (computed based a BFEA table) can be applied to different regions of the same memory block. Namely, an individual read threshold voltage can be retrieved from the BFEA table to be applied for reading data from the memory block and the read threshold voltage can then be adjusted for some, but not all, regions (e.g., regions associated with pseudo-folding events) of the memory block using previously determined CoV read offsets of those regions. This can reduce the RBER associated with reading data from the portion which can improve the overall performance of the memory sub-system.

Specifically, the disclosed memory controller receives a request to read a portion from the memory device and computes a read threshold voltage for reading data from the portion of the memory device. The memory controller determines whether the portion is associated with a pseudo-folding event and, in response to determining whether the portion is associated with the pseudo-folding event, selectively applies an additional read offset to the read threshold voltage to read the data from the portion of the memory device. The portion can include at least one of a BS, an individual page, WL, word line group, memory die, or an individual block of a plurality of blocks of the BS.

In some examples, the memory controller accesses a BFEA table and obtains the read threshold voltage that is associated with the portion in the BFEA table. The memory controller, prior to receiving the request to read the portion, performs a media scan operation and determines, based on the media scan operation, that the portion is associated with an RBER that transgresses a threshold RBER value. The memory controller, in response to determining that the portion is associated with the RBER that transgresses the threshold RBER value, performs a VHC to measure a width of a valley associated with the portion and computes an individual CoV read offset associated with the portion based on performing the VHC. The memory controller compares the width of the valley to a valley width threshold and selectively refreshes the portion in response to comparing the width of the valley to the valley width threshold.

The memory controller can determine that the width of the valley fails to transgress the valley width threshold and, in response to determining that the width of the valley fails to transgress the valley width threshold, refreshes the portion. The memory controller can determine that the width of the valley transgresses the valley width threshold and, in response to determining that the width of the valley fails to transgress the valley width threshold, can add the portion to a list of portions associated with pseudo-folding events. The memory controller can store, in association with the portion, the individual CoV read offset computed based on the VHC.

In some examples, the memory controller maintains a table that associates different CoV read offsets, computed based on respectively performed VHCs, with each portion on the list of portions that are associated with pseudo-folding events. The memory controller can determine that the portion is associated with the pseudo-folding event in response to determining that the portion is included in the list of portions associated with pseudo-folding events. The memory controller can retrieve, from the table that associates different CoV read offsets, the individual CoV read offset computed based on the VHC associated with the portion and can using the retrieved individual CoV read offset as the additional read offset that is applied to the read threshold voltage to read the data from the portion.

The memory controller can store a counter in association with the portion stored in the list of portions associated with pseudo-folding events. The memory controller can detect an additional pseudo-folding event associated with the portion and increment the counter in response to detecting the additional pseudo-folding event associated with the portion. The memory controller, in response to determining that the counter transgresses a threshold count value, updates a statistical measure including the individual CoV read offset. The statistical measure can include a mean or median. The memory controller, prior to updating the statistical measure, obtains a new CoV read offset computed in response to detecting the additional pseudo-folding event and compares the new CoV read offset with the statistical measure. The memory controller can selectively discard the new CoV read offset in response to determining whether the new CoV read offset is an outlier based on comparing the new CoV read offset with the statistical measure.

In some examples, the memory controller determines that the new CoV read offset has not been discarded. The memory controller can update the statistical measure using the new CoV read offset in response to determining that the new CoV read offset has not been discarded. The memory controller can determine that the new CoV read offset is more than three sigma from the statistical measure and, in response to determining that the new CoV read offset is more than three sigma from the statistical measure, can discard the new CoV read offset. The memory controller can periodically update the statistical measure based on newly computed CoV read offsets for the portion. In some cases, the counter can be stored in association with a memory die that stores the portion of the memory device and updated each time a pseudo-folding event is detected in association with one or more portions of the memory die. In some cases, the counter is stored in association with a word line (WL) or word line group that stores the portion of the memory device and is updated each time a pseudo-folding event is detected in association with one or more portions of the WL or word line group.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing system 100 that includes a memory sub-system 110, in accordance with some examples. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some examples, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some examples, each of the memory devices 130, 140 can include one or more arrays of memory cells such as SLCs, MLCs, TLCs, QLCs, or any combination of such. In some examples, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks or BSs. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some examples, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another example, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, GC operations, error detection and ECC operations, encryption operations, caching operations, and address translations between a logical address (e.g., LBA, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some examples, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some examples, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a read threshold voltage component 113 that enables or facilitates the memory sub-system controller 115 to dynamically adjust a read threshold voltage used to read data from a memory block or portion. Specifically, the read threshold voltage component 113 can receive a request to read a portion from the memory device 130 and compute a read threshold voltage for reading data from the portion of the memory device 130. The read threshold voltage component 113 determines whether the portion is associated with a pseudo-folding event and, in response to determining whether the portion is associated with the pseudo folding event, selectively applies an additional read offset to the read threshold voltage to read the data from the portion of the memory device 130. Any discussion with respect to the memory device 130 can similarly be applied to the memory device 140 alone or in combination.

Figure 2:
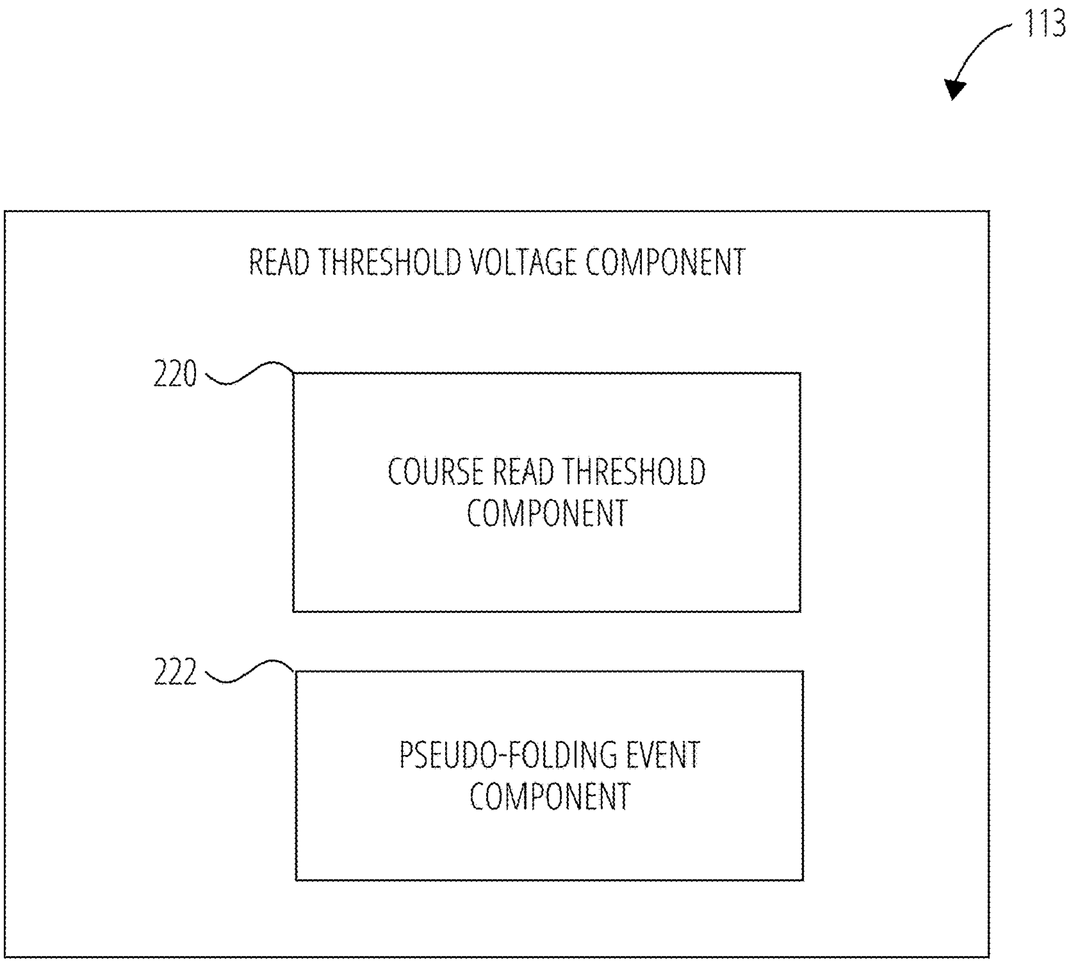
FIG. 2 is a block diagram of a read threshold voltage component, in accordance with some examples.

FIG. 2 is a block diagram of a read threshold voltage component 113, in accordance with some examples. The read threshold voltage component 113 can include a course read threshold component 220 and a pseudo-folding event component 222.

The course read threshold component 220 can receive a request from a host system 120 to read a memory block from the memory device 130. In response, the course read threshold component 220 can access a BFEA table to obtain a read threshold level for reading data from the memory block (such as a BS, page, or some other portion or region) of the memory device 130. In some cases, this read threshold level is retrieved by the course read threshold component 220 in response to identifying a block family associated with the memory block (e.g., representing how long data has been stored in the portion) and accessing the read threshold level associated with the block family from the BFEA table.

In some cases, the course read threshold component 220 can communicate with the pseudo-folding event component 222 to determine whether any portion of the memory block is associated with a pseudo-folding event. The pseudo-folding event component 222 can search a pseudo-folding event list to determine whether any portion of the memory block is associated with the pseudo-folding event. For example, if the pseudo-folding event component 222 detects that one or more portions of the memory block are on the pseudo-folding event list, the pseudo-folding event component 222 retrieves an additional read offset associated with the one or more portions (e.g., a CoV read offset) and provides the additional read offset to the course read threshold component 220. The course read threshold component 220 can then modify or adjust the read level obtained from the BFEA table to read data from the portion of the memory block by the additional read offset provided by the pseudo-folding event component 222. Other portions of the memory block that are not associated with the pseudo-folding event may be read by the course read threshold component 220 using the unmodified read threshold voltage that was obtained from the BFEA table.

The pseudo-folding event list can be managed and generated by the pseudo-folding event component 222. An example pseudo-folding event list is shown in diagram 300 of FIG. 3.

Figure 3:
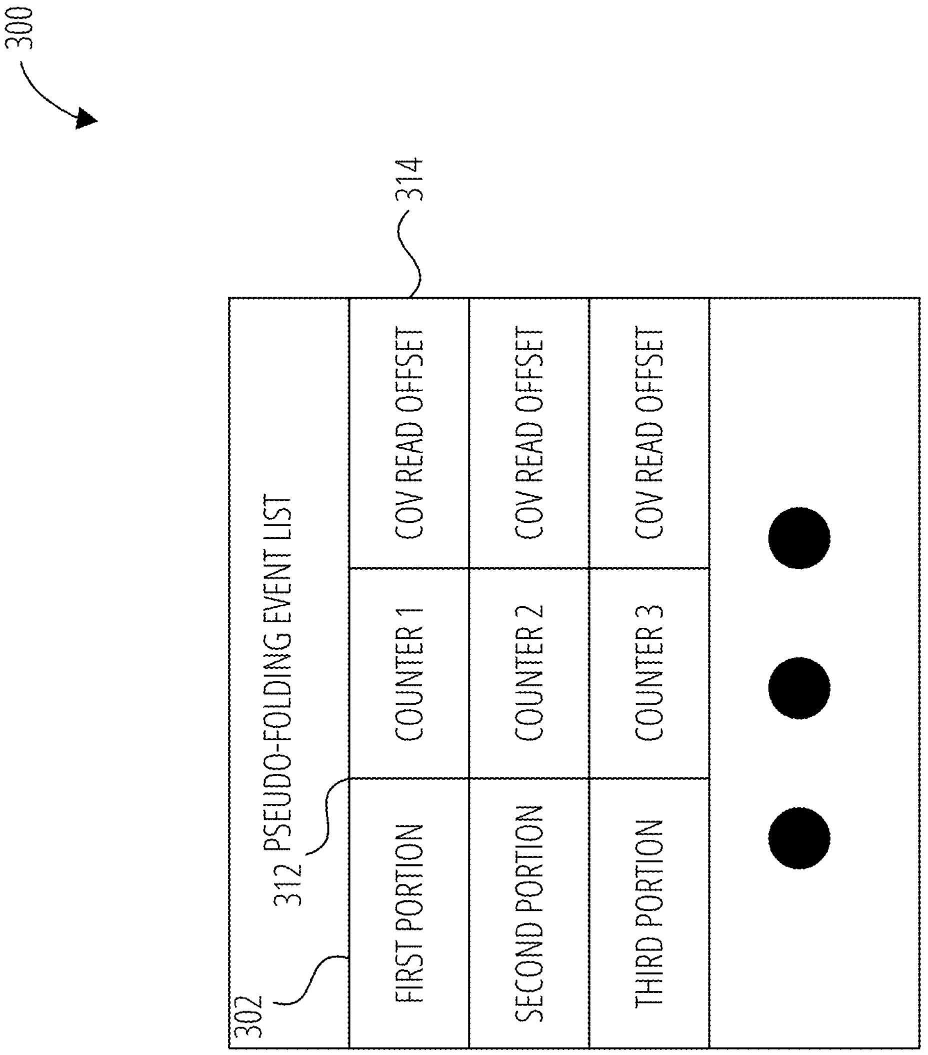
FIG. 3 illustrates a diagram of a pseudo-folding event list, in accordance with some examples.

For example, as shown in FIG. 3, the pseudo-folding event component 222 can periodically perform a media scan operation on one or more blocks of the memory device 130. During the media scan operation, the pseudo-folding event component 222 can measure or compute the RBER of each of the one or more blocks. The pseudo-folding event component 222 can determine that an individual block has a corresponding RBER that transgresses a threshold RBER value. In such cases, the pseudo-folding event component 222 can perform an additional operation to determine whether to add the individual block or portions of the block to the pseudo-folding event list.

Specifically, in response to determining that the RBER of the individual block or portion of the block (e.g., a page, WL, word line group, individual blocks of a set of blocks of a BS, and so forth) transgresses (e.g., exceeds) the threshold RBER value, the pseudo-folding event component 222 can perform a VHC on the portion. To do so, the pseudo-folding event component 222 can perform an ARC process to identify a CoV associated with the individual block or portion of the block. The identified CoV is then used to measure a bit error count (BEC) associated with reading data at two voltage levels that are adjacent to the identified CoV (one above and one below the CoV). The pseudo-folding event component 222 can sum the two BEC values to compute an aggregated BEC value and compare the aggregated BEC value to a BEC threshold. In response to determining that the aggregated BEC value is below the BEC threshold, the pseudo-folding event component 222 determines that the width of the valley associated with the individual block or portion of the block is greater than a minimum width threshold. In such cases, the pseudo-folding event component 222 prevents folding or refreshing the individual block or portion of the block and adds the individual block or portion of the block as a first portion 302 of the pseudo-folding event list. In response to determining that the aggregated BEC value is above the BEC threshold, the pseudo-folding event component 222 determines that the width of the valley associated with the individual block or portion of the block is less than the minimum width threshold. In such cases, the pseudo-folding event component 222 folds or refreshes the individual block or portion of the block.

In the process of adding the individual block or portion of the block to the pseudo-folding event list, the pseudo-folding event component 222 adds or updates a first counter 312 that tracks how many times a pseudo-folding event has been performed relative to the individual block or portion of the block. Namely, the first counter 312 tracks how many times the media scan operation has detected an RBER associated with the individual block or portion of the block that is greater than the RBER threshold value and that the individual block or portion of the block has a valley width that is greater than the minimum width threshold. The first counter 312 can represent how many times a particular memory block has been identified by the media scan as a potential block to refresh but which was not refreshed because the block met another criterion (e.g., the associated valley width was sufficiently large).

In some cases, multiple counters including the first counter 312 can be stored in association with each portion including the first portion 302 that is maintained or stored in the pseudo-folding event list. For example, the first counter 312 can be specific to a particular page, WL, word line group, or page of a memory block or BS. In such cases, the first counter 312 can be incremented each time the RBER of the media scan operation performed on a memory block that includes the first portion 302 transgresses the RBER threshold and in response to the first portion 302 not being refreshed based on that media scan operation. In some examples, a single counter can be stored in association with an individual memory die that includes the first portion 302. In such cases, the single counter can be incremented each time the RBER of the media scan operation performed on any memory block stored on the individual memory die transgresses the RBER threshold and in response to the respective memory block not being refreshed based on that media scan operation.

The pseudo-folding event component 222 can store, in association with each portion in the pseudo-folding event list, a corresponding CoV that was computed based on performing the media scan operation on that portion. For example, the pseudo-folding event component 222 can also store a CoV read offset 314 in association with the first portion 302. The CoV read offset 314 can be retrieved based on the ARC process that was used to identify the CoV for computing the width of the valley of the CoV read offset 314. In some cases, the CoV read offset 314 that is stored in association with the first portion 302 corresponds to or represents or is a statistical measure of multiple CoV samples that were collected over the course of performing multiple media scan operations on the block that includes the first portion 302.

In some cases, the CoV read offset 314 can only be updated based on a newly computed CoV read offset after a threshold number of CoV read offset samples are collected. In some cases, a newly computed CoV read offset for the first portion 302 can be used to update a previously stored CoV read offset, such as the CoV read offset 314, in response to determining that the newly computed CoV read offset satisfies certain criteria (e.g., is within three sigma deviation from the CoV read offset 314 stored in association with the first portion 302).

Figure 4:
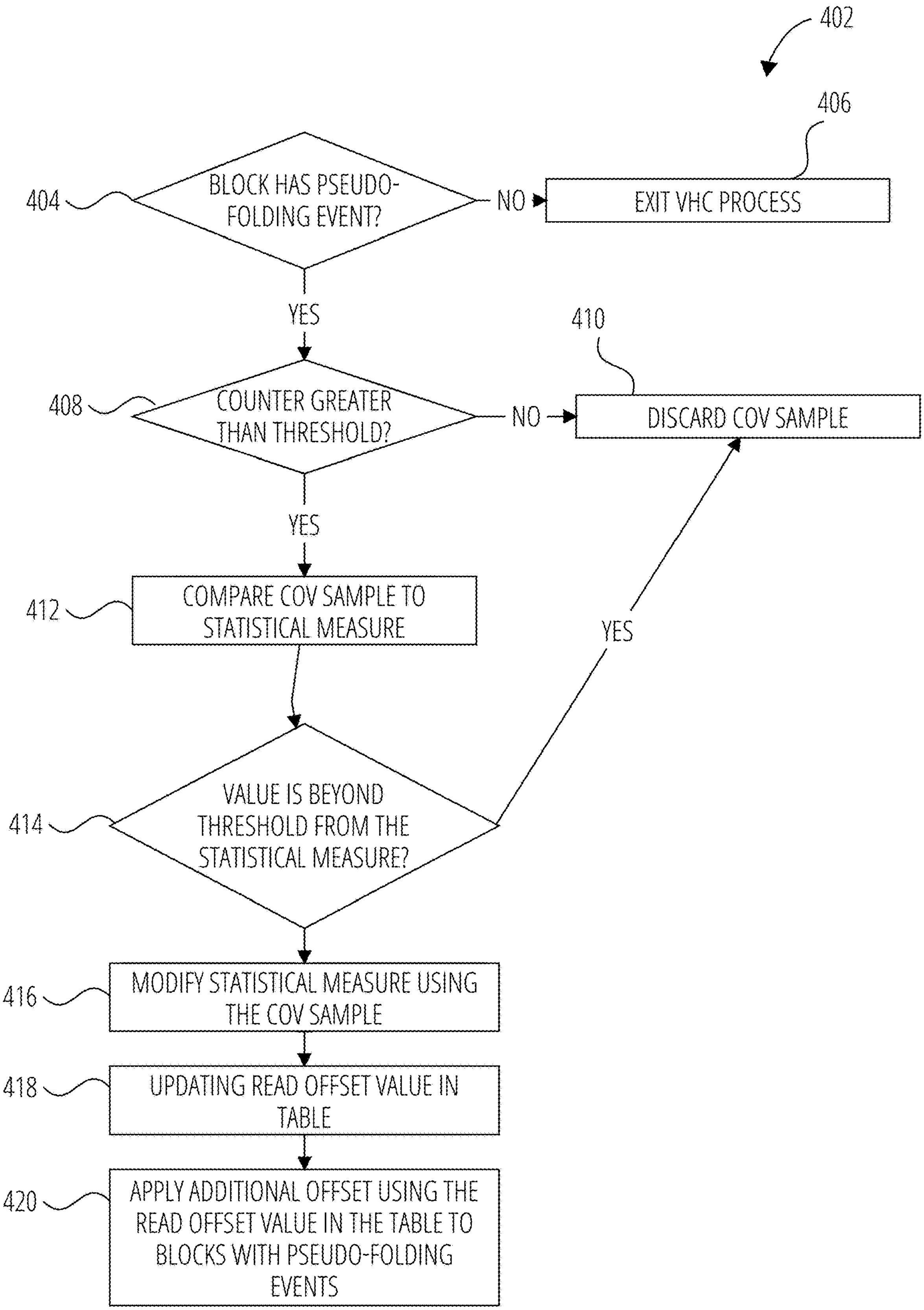
FIG. 4 is a flow diagram of an example method to adjust a read threshold voltage, in accordance with some examples.

For example, as shown in method 402 of FIG. 4, the pseudo-folding event component 222 can selectively update the CoV read offset 314 that is stored in association with the first portion 302. While the disclosed techniques are described with reference to the first portion 302, similar processes can be performed for any other portion stored in the pseudo-folding event list of diagram 300. Specifically, the pseudo-folding event component 222 can perform a media scan operation on a memory block that includes the first portion 302. In response, the pseudo-folding event component 222 can measure the RBER of the memory block (or first portion 302) and compare the RBER to the RBER threshold. If the RBER transgresses the threshold, the pseudo-folding event component 222 can determine whether a valley width of the first portion 302 exceeds a minimum valley width by computing a new CoV read offset, such as using the ARC process. In response to determining that the valley width of the first portion 302 exceeds the minimum valley width, the pseudo-folding event component 222 detects that the block has a pseudo-folding event.

The pseudo-folding event component 222 at operation 404 determines whether the first portion 302 has previously been added to the pseudo-folding event list. If not, the pseudo-folding event component 222 adds the first portion 302 to the pseudo-folding event list and exits the VHC process at operation 406. If pseudo-folding event component 222 determines that the first portion 302 is already on the pseudo-folding event list, the pseudo-folding event component 222 retrieves from first counter 312 associated with the first portion 302. The first counter 312 can be specific to the first portion 302 or can be associated with a memory die or WL that includes the first portion 302.

At operation 408, the pseudo-folding event component 222 increments the first counter 312 and compares the first counter 312 to a threshold. If the pseudo-folding event component 222 detects that the first counter 312 after being incremented is greater than the threshold, the pseudo-folding event component 222 proceeds to operation 412 and otherwise proceeds to operation 410 where the new CoV read offset is discarded. The operation 408 is used to avoid or prevent updating the previously stored CoV read offset 314 too frequently. This way, a minimum amount of CoV computations for the first portion 302 may be performed before a most recent CoV computation is used to update or adjust the previously stored CoV read offset 314.

At operation 412, the pseudo-folding event component 222 obtains the previously stored CoV read offset 314 associated with the first portion 302. The previously stored CoV read offset 314 can be a statistical measure or accumulation of many CoV read offsets computed at prior intervals in association with the first portion 302. The pseudo-folding event component 222 compares, at operation 412, the previously stored CoV read offset 314 with the new CoV read offset that has been computed. The pseudo-folding event component 222 determines, at operation 414, whether the new CoV read offset (new CoV read offset sample) is within a certain distance or standard deviation (e.g., three sigma) from the previously stored CoV read offset 314. If so, the pseudo-folding event component 222 proceeds to operation 416. If the new CoV read offset is beyond the distance or standard deviation from the previously stored CoV read offset 314, the pseudo-folding event component 222 determines that the new CoV read offset is an outlier and proceeds to operation 410 to discard the new CoV read offset. By discarding the new CoV read offset, the pseudo-folding event component 222 prevents updating the previously stored CoV read offset 314 and continues using the previously stored CoV read offset 314 to adjust the read threshold voltage obtained from the BFEA table for reading data from a memory block that includes the first portion 302.

At operation 416, the pseudo-folding event component 222 modifies the previously stored CoV read offset 314 using the new CoV read offset. For example, the pseudo-folding event component 222 can compute a mean or median of the previously stored CoV read offset 314 (or set of previously stored CoV read offsets) and the new CoV read offset. The pseudo-folding event component 222 can then update the CoV read offset 314 stored in the first portion 302 using the computed mean or median at operation 418. The pseudo-folding event component 222 provides the CoV read offset 314 to the course read threshold component 220 to read data from the first portion 302 in response to a request to read a memory block that includes the first portion 302 received from the host system 120 at operation 420.

Figure 5:
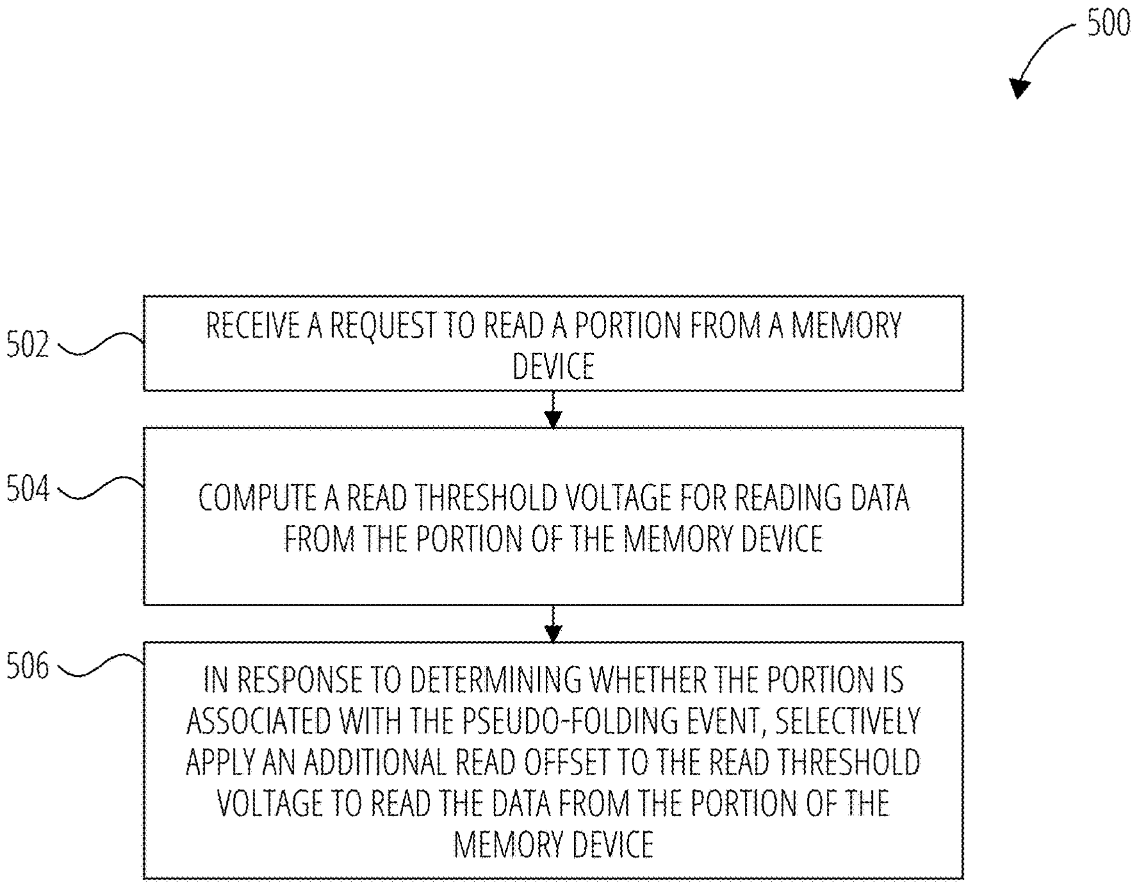
FIG. 5 is a flow diagram of an example method to adjust a read threshold voltage, in accordance with some examples.

FIG. 5 is a flow diagram of an example method 500 (or process) to identify bad blocks, in accordance with some examples. Method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the memory sub-system controller 115 or subcomponents of the memory sub-system controller 115 of FIG. 1. In these examples, the method 500 can be performed, at least in part, by the read threshold voltage component 113. Although the processes are shown in a particular sequence or order, unless otherwise specified, the order of the processes can be modified. Thus, the illustrated examples should be understood only as examples; the illustrated processes can be performed in a different order, and some processes can be performed in parallel. Additionally, one or more processes can be omitted in various examples. Thus, not all processes are required in every example. Other process flows are possible.

Referring now to FIG. 5, the method 500 begins at operation 502, with the read threshold voltage component 113 of a memory sub-system 110 (e.g., memory device 140) receiving a request to read a portion from a memory device 130. The read threshold voltage component 113 computes a read threshold voltage for reading data from the portion of the memory device at operation 504. Then, the read threshold voltage component 113, at operation 506, in response to determining whether the portion is associated with the pseudo-folding event, selectively applies an additional read offset to the read threshold voltage to read the data from the portion of the memory device 130.

Figure 6:
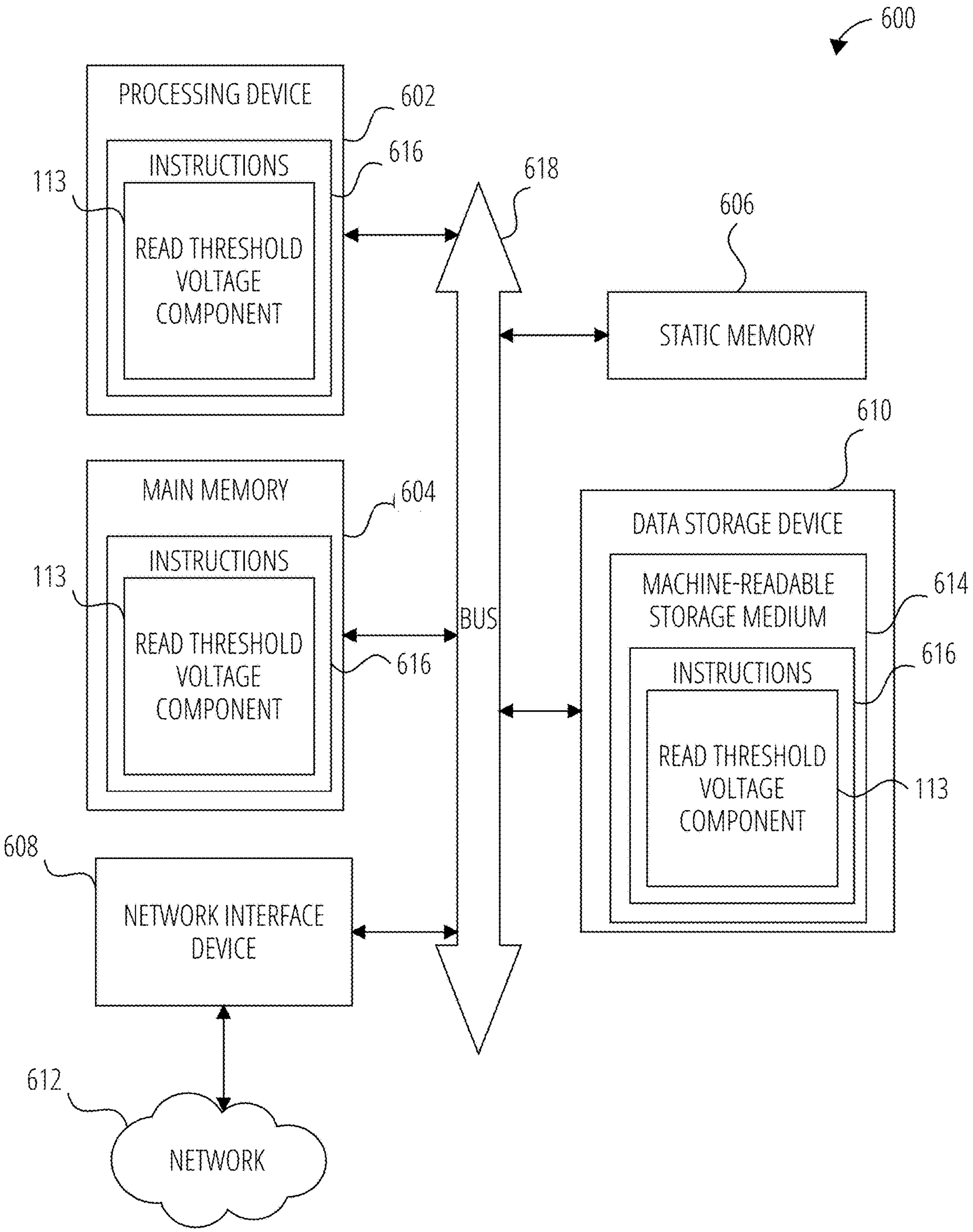
FIG. 6 is a block diagram of an example computer system in which some examples may operate.

FIG. 6 illustrates an example machine in the form of a computer system 600 within which a set of instructions can be executed for causing the machine to perform any one or more of the methodologies discussed herein. In some examples, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage device 610, which communicate with each other via a bus 618.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application-specific integrated circuit (ASIC), a field programmable gate array (FPGA), a digital signal processor (DSP), a network processor, or the like. The processing device 602 is configured to execute instructions 616 for performing the operations and steps discussed herein. The computer system 600 can further include a network interface device 608 to communicate over a network 612.

The data storage device 610 can include a machine-readable storage medium 614 (also known as a computer-readable medium) on which is stored one or more sets of instructions 616 or software embodying any one or more of the methodologies or functions described herein. The instructions 616 can also reside, completely or at least partially, within the main memory 604 and/or within the processing device 602 during execution thereof by the computer system 600, the main memory 604 and the processing device 602 also constituting machine-readable storage media. The machine-readable storage medium 614, data storage device 610, and/or main memory 604 can correspond to the memory sub-system 110 of FIG. 1.

In one example, the instructions 616 include instructions to implement functionality corresponding to providing block failure protection for a zone memory sub-system as described herein (e.g., the read threshold voltage component 113 of FIG. 1). While the machine-readable storage medium 614 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1. A system comprising: a memory device; and a processing device, operatively coupled to the memory device, configured to perform operations comprising: receiving a request to read a portion from the memory device; computing a read threshold voltage for reading data from the portion of the memory device; determining whether the portion is associated with a pseudo-folding event; and in response to determining whether the portion is associated with the pseudo-folding event, selectively applying an additional read offset to the read threshold voltage to read the data from the portion of the memory device.

Example 2. The system of Example 1, wherein the portion comprises at least one of a block stripe (BS), an individual page, word line (WL), word line group, memory die, or an individual block of a plurality of blocks of the BS.

Example 3. The system of any one of Examples 1-2, the operations comprising: accessing a block family error avoidance (BFEA) table; and obtaining the read threshold voltage that is associated with the portion in the BFEA table.

Example 4. The system of any one of Examples 1-3, the operations comprising: prior to receiving the request to read the portion, performing a media scan operation; determining, based on the media scan operation, that the portion is associated with a read bit error rate (RBER) that transgresses a threshold RBER value; in response to determining that the portion is associated with the RBER that transgresses the threshold RBER value, performing a valley health check (VHC) to measure a width of a valley associated with the portion;

and computing an individual CoV read offset associated with the portion based on performing the VHC.

Example 5. The system of Example 4, the operations comprising: comparing the width of the valley to a valley width threshold; and selectively refreshing the portion in response to comparing the width of the valley to the valley width threshold.

Example 6. The system of Example 5, the operations comprising: determining that the width of the valley fails to transgress the valley width threshold; and in response to determining that the width of the valley fails to transgress the valley width threshold, refreshing the portion.

Example 7. The system of any one of Examples 5-6, the operations comprising: determining that the width of the valley transgresses the valley width threshold; in response to determining that the width of the valley fails to transgress the valley width threshold, adding the portion to a list of portions associated with pseudo-folding events; and storing, in association with the portion, the individual CoV read offset computed based on the VHC.

Example 8. The system of Example 7, the operations comprising: maintaining a table that associates different CoV read offsets, computed based on respectively performed VHCs, with each portion on the list of portions that are associated with pseudo-folding events.

Example 9. The system of Example 8, the operations comprising: determining that the portion is associated with the pseudo-folding event in response to determining that the portion is included in the list of portions associated with pseudo-folding events.

Example 10. The system of Example 9, the operations comprising: retrieving, from the table that associates different CoV read offsets, the individual CoV read offset computed based on the VHC associated with the portion; and using the retrieved individual CoV read offset as the additional read offset that is applied to the read threshold voltage to read the data from the portion.

Example 11. The system of any one of Examples 8-10, the operations comprising: storing a counter in association with the portion stored in the list of portions associated with pseudo-folding events; detecting an additional pseudo-folding event associated with the portion; incrementing the counter in response to detecting the additional pseudo-folding event associated with the portion; in response to determining that the counter transgresses a threshold count value, updating a statistical measure comprising the individual CoV read offset.

Example 12. The system of Example 11, wherein the statistical measure comprises a mean or median.

Example 13. The system of any one of Examples 11-12, the operations comprising: prior to updating the statistical measure, obtaining a new CoV read offset computed in response to detecting the additional pseudo-folding event; comparing the new CoV read offset with the statistical measure; and selectively discarding the new CoV read offset in response to determining whether the new CoV read offset is an outlier based on comparing the new CoV read offset with the statistical measure.

Example 14. The system of Example 13, the operations comprising: determining that the new CoV read offset has not been discarded; and updating the statistical measure using the new CoV read offset in response to determining that the new CoV read offset has not been discarded.

Example 15. The system of any one of Examples 13-14, the operations comprising: determining that the new CoV read offset is more than three sigma from the statistical measure; and in response to determining that the new CoV read offset is more than three sigma from the statistical measure, discarding the new CoV read offset.

Example 16. The system of any one of Examples 13-15, the operations comprising: periodically updating the statistical measure based on newly computed CoV read offsets for the portion.

Example 17. The system of any one of Examples 11-16, wherein the counter is stored in association with a memory die that stores the portion of the memory device, and wherein the counter is updated each time a pseudo-folding event is detected in association with one or more portions of the memory die.

Example 18. The system of any one of Examples 11-17, wherein the counter is stored in association with a word line (WL) or word line group that stores the portion of the memory device, and wherein the counter is updated each time a pseudo-folding event is detected in association with one or more portions of the WL or word line group.

Example 19. At least one non-transitory machine-readable storage medium comprising instructions that, when executed by a processing device, cause the processing device to perform operations comprising: receiving a request to read a portion from a memory device; computing a read threshold voltage for reading data from the portion of the memory device; determining whether the portion is associated with a pseudo-folding event; and in response to determining whether the portion is associated with the pseudo-folding event, selectively applying an additional read offset to the read threshold voltage to read the data from the portion of the memory device.

Example 20. A method comprising: receiving a request to read a portion from a memory device; computing a read threshold voltage for reading data from the portion of the memory device; determining whether the portion is associated with a pseudo-folding event; and in response to determining whether the portion is associated with the pseudo-folding event, selectively applying an additional read offset to the read threshold voltage to read the data from the portion of the memory device.

"BFEA" refers to refers to a sophisticated technique used to enhance the reliability and performance of NAND-based storage devices, particularly in solid-state drives (SSDs). BFEA (block family error avoidance) involves grouping or categorizing blocks with similar error characteristics to optimize error management strategies. In NAND flash memory, blocks can develop varying error rates over time due to factors such as wear, manufacturing variations, and environmental conditions. The block family error avoidance bin strategy addresses this by monitoring and analyzing the error rates of individual blocks, then grouping blocks with similar error profiles into "families" or "bins." Once categorized, specific error management techniques are applied to each bin based on its unique error characteristics. This approach allows the memory controller to optimize error correction code (ECC) strategies, adjust read voltage thresholds more effectively, implement targeted wear-leveling algorithms, and prioritize blocks for garbage collection or retirement based on their error bin.

"CFBit" refers to refers to a count of a total quantity of '1's that are stored or represented by an individual read level of a portion, such as a memory block, of the memory device. The CFBit count can be cumulative such that read levels associated with higher read voltages have a higher CFBit count than read levels associated with lower read voltages. Namely, the memory device can generate a total CFBit count and divide that total CFBit count by the total number of read levels that can be used to stored data in the memory device. A first CFBit count can be obtained by reading a quantity of '1's (or alternatively '0's) stored at a first read level and a second CFBit count can be obtained by reading a quantity of '1's (or alternatively '0's) stored at a second read level (which can be adjacent to the first read level). The second read level can be associated with a higher voltage than the first read level and, as a result, the CFBit count of the second read level includes the first CFBit count (e.g., the CFBit count of the first read level) and the CFBit count of the second read level. These CFBit counts can be used to determine a CoV and identify, based on the CoV, a read level for reading data from a given level of the memory device.

"Coupled with" generally refers to a connection between components, which can be an indirect communicative connection or direct communicative connection (e.g., without intervening components), whether wired or wireless, including connections such as electrical, optical, magnetic, and the like.

"Center of valley (CoV)" refers to the lowest point between two adjacent threshold voltage distribution peaks. It represents the midpoint of the voltage range that separates two distinct programmed states in a NAND cell. This point is used for determining the optimal read voltage and assessing the health of the cell. A well-defined center of valley indicates clear separation between voltage states, which is important for reliable data storage and retrieval. In the context of valley health checks, the position and depth of this center point are key indicators of cell stability and potential degradation over time.

"User data" hereinafter generally refers to host data and garbage collection data.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (such as a non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, examples of the disclosure have been described with reference to specific examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

The invention claimed is:

1. A system comprising:

a memory device; and a processing device, operatively coupled to the memory device, programmed to perform operations comprising:

determining that a portion of the memory device satisfies multiple criteria including the portion being associated with a bit error rate (BER) that transgresses a threshold value and having a width of a valley associated with the portion that transgresses a valley width threshold;

computing a center of valley (CoV) read offset associated with the portion based on the width of the valley;

based on determining that the portion of the memory device satisfies the multiple criteria, adding the portion to a list of portions associated with pseudo-folding events and storing a CoV read offset in association with the portion in the list;

after adding determining that the portion of the memory device satisfies the multiple criteria, receiving a request to read the portion from the memory device;

computing a read threshold voltage for reading data from the portion of the memory device;

determining that the portion is associated with a pseudo-folding event based on determining that the portion is include in the list of portions; and based on determining that the portion is associated with the pseudo-folding event, applying an additional read offset comprising the stored CoV read offset that was computed based on the width of the valley to the read threshold voltage to read the data from the portion of the memory device.

2. The system of claim 1, wherein the portion comprises at least one of a block stripe (BS), an individual page, word line (WL), word line group, memory die, or an individual block of a plurality of blocks of the BS.

3. The system of claim 1, the operations comprising:

accessing a block family error avoidance (BFEA) table; and obtaining the read threshold voltage that is associated with the portion in the BFEA table.

4. The system of claim 1, the operations comprising:

prior to receiving the request to read the portion, performing a media scan operation;

determining, based on the media scan operation, that the portion is associated with the BER that transgresses the threshold value;

in response to determining that the portion is associated with the BER that transgresses the threshold value, performing a valley health check (VHC) to measure the width of the valley associated with the portion; and computing the CoV read offset associated with the portion based on performing the VHC.

5. The system of claim 4, the operations comprising:

comparing the width of the valley to the valley width threshold; and selectively refreshing the portion in response to comparing the width of the valley to the valley width threshold.

6. The system of claim 5, the operations comprising:

determining that the width of the valley fails to transgress the valley width threshold; and in response to determining that the width of the valley fails to transgress the valley width threshold, refreshing the portion.

7. The system of claim 5, the operations comprising:

determining that the width of the valley transgresses the valley width threshold;

in response to determining that the width of the valley fails to transgress the valley width threshold, adding the portion to the list of portions associated with pseudo-folding events; and storing, in association with the portion, the CoV read offset computed based on the VHC.

8. The system of claim 7, the operations comprising:

maintaining a table that associates different CoV read offsets, computed based on respectively performed VHCs, with each portion on the list of portions that are associated with pseudo-folding events.

9. The system of claim 8, the operations comprising:

determining that the portion is associated with the pseudo-folding event in response to determining that the portion is included in the list of portions associated with pseudo-folding events.

10. The system of claim 9, the operations comprising:

retrieving, from the table that associates different CoV read offsets, the CoV read offset computed based on the VHC associated with the portion; and using the retrieved CoV read offset as the additional read offset that is applied to the read threshold voltage to read the data from the portion.

11. The system of claim 8, the operations comprising:

storing a counter in association with the portion stored in the list of portions associated with pseudo-folding events;

detecting an additional pseudo-folding event associated with the portion;

incrementing the counter in response to detecting the additional pseudo-folding event associated with the portion;

in response to determining that the counter transgresses a threshold count value, updating a statistical measure comprising the CoV read offset.

12. The system of claim 11, the operations comprising:

prior to updating the statistical measure, obtaining a new CoV read offset computed in response to detecting the additional pseudo-folding event;

comparing the new CoV read offset with the statistical measure; and selectively discarding the new CoV read offset in response to determining whether the new CoV read offset is an outlier based on comparing the new CoV read offset with the statistical measure.

13. The system of claim 12, the operations comprising:

determining that the new CoV read offset has not been discarded; and updating the statistical measure using the new CoV read offset in response to determining that the new CoV read offset has not been discarded.

14. The system of claim 12, the operations comprising:

determining that the new CoV read offset is more than three sigma from the statistical measure; and in response to determining that the new CoV read offset is more than three sigma from the statistical measure, discarding the new CoV read offset.

15. The system of claim 12, the operations comprising:

periodically updating the statistical measure based on newly computed CoV read offsets for the portion.

16. The system of claim 11, wherein the counter is stored in association with a memory die that stores the portion of the memory device, and wherein the counter is updated each time a pseudo-folding event is detected in association with one or more portions of the memory die.

17. The system of claim 1, the operations comprising:

storing a counter in association with the portion stored in the list of portions associated with pseudo-folding events;

detecting an additional pseudo-folding event associated with the portion;

incrementing the counter in response to detecting the additional pseudo-folding event associated with the portion;

in response to determining that the counter transgresses a threshold count value, updating a statistical measure comprising the CoV read offset.

18. The system of claim 1, wherein determining that the width of the valley transgresses the valley width threshold comprises:

computing the center of valley (CoV) associated with the portion using an adaptive read calibration (ARC) process;

reading data from the portion at a first voltage level below the computed CoV and at a second voltage level above the computed CoV;

determining a first bit error count (BEC) associated with reading data at the first voltage level and a second BEC associated with reading data at the second voltage level;

computing an aggregated BEC value by summing the first BEC and the second BEC; and determining that the aggregated BEC value is below a BEC threshold; and in response to determining that the aggregated BEC value is below the BEC threshold, determining that the width of the valley transgresses the valley width threshold.

19. At least one non-transitory machine-readable storage medium comprising instructions that, when executed by a processing device, cause the processing device to perform operations comprising:

determining that a portion of a memory device satisfies multiple criteria including the portion being associated with a bit error rate (BER) that transgresses a threshold value and having a width of a valley associated with the portion that transgresses a valley width threshold;

computing a center of valley (CoV) read offset associated with the portion based on the width of the valley;

based on determining that the portion of the memory device satisfies the multiple criteria, adding the portion to a list of portions associated with pseudo-folding events and storing a CoV read offset in association with the portion in the list;

after adding determining that the portion of the memory device satisfies the multiple criteria, receiving a request to read the portion from the memory device;

computing a read threshold voltage for reading data from the portion of the memory device;

determining that the portion is associated with a pseudo-folding event based on determining that the portion is include in the list of portions; and based on determining that the portion is associated with the pseudo-folding event, applying an additional read offset comprising the stored CoV read offset that was computed based on the width of the valley to the read threshold voltage to read the data from the portion of the memory device.

20. A method comprising:

determining that a portion of a memory device satisfies multiple criteria including the portion being associated with a bit error rate (BER) that transgresses a threshold value and having a width of a valley associated with the portion that transgresses a valley width threshold;

computing a center of valley (CoV) read offset associated with the portion based on the width of the valley;

based on determining that the portion of the memory device satisfies the multiple criteria, adding the portion to a list of portions associated with pseudo-folding events and storing a CoV read offset in association with the portion in the list;

after adding determining that the portion of the memory device satisfies the multiple criteria, receiving a request to read the portion from the memory device;

computing a read threshold voltage for reading data from the portion of the memory device;

determining that the portion is associated with a pseudo-folding event based on determining that the portion is include in the list of portions; and based on determining that the portion is associated with the pseudo-folding event, applying an additional read offset comprising the stored CoV read offset that was computed based on the width of the valley to the read threshold voltage to read the data from the portion of the memory device.

* * * * *